US005148344A

United States Patent [19]

Rao et al.

[11] Patent Number: 5,148,344

[45] Date of Patent: Sep. 15, 1992

[54] APPLIANCE LEAKAGE CURRENT INTERRUPTER

[75] Inventors: Chepur P. Rao, North Kingstown; Juan J. Barrena, Providence; Victor V. Aromin, West Warwick; John J. Astley, Barrington, all of R.I.

[73] Assignee: Tower Manufacturing Corporation, Providence, R.I.

[21] Appl. No.: 567,771

[22] Filed: Aug. 6, 1990

[51] Int. Cl.[5] ..................... H02H 3/16

[52] U.S. Cl. ..................... 361/42; 361/50; 361/115

[58] Field of Search ..................... 361/42, 45, 50, 115; 335/18, 164; 200/43.16, 43.01

[56] References Cited

U.S. PATENT DOCUMENTS

| | | | |
|---|---|---|---|
| 4,719,437 | 1/1988 | Yun | 335/18 |
| 4,851,951 | 7/1989 | Foster, Jr. | 361/50 |

*Primary Examiner*—Howard L. Williams
*Assistant Examiner*—S. Jackson
*Attorney, Agent, or Firm*—Salter, Michaelson & Benson

[57] ABSTRACT

An appliance leakage current interrupter (ALCI) comprising a ground fault detecting circuit and a trip mechanism that is automatically actuated in response to the presence of a ground fault. Actuation of the trip mechanism automatically interrupts the flow of current to the appliance and permits movement of a reset button to take place to visually signal that current to the appliance has been interrupted, although interruption of current flow is not in any way dependent on movement of the reset button, whereupon if movement of the reset button is prevented for any reason, flow of current to the appliance is still automatically and instantaneously interrupted in response to the presence of a ground fault. A test button is provided, actuation of which simulates a ground fault to enable a user at any time to determine whether the ALCI is working properly. The reset and test buttons are mounted on the housing of the ALCI in close adjacency to each other for maximum compactness, and are protected against undesirable manipulation and accidental operation by an integral guard wall extending from the housing defining an enclosure in which said buttons are positioned.

6 Claims, 5 Drawing Sheets

APPLIANCE LEAKAGE CURRENT INTERRUPTER

BACKGROUND OF THE INVENTION

This invention relates specifically to an appliance leakage current interrupter, commonly known in the industry as an ALCI. Devices of this general type are known in the industry as ground fault interrupters (GFIs).

It has long been recognized that in certain types of small appliances it is desirable that if any ground fault occurs in the device, the flow of current be immediately interrupted to prevent the user from being subject to an electrical shock. For example, certain types of appliances, such as hair dryers, electric shavers, radios, etc., may be used by the owner while he or she is taking a bath. If the appliance should inadvertently fall into the water, in many cases a ground fault or electrical short will occur, causing a severe electrical shock to one who is bathing in the water, which in numerous cases has proven to be fatal. Recognizing the severity of this problem, the Consumer Product Safety Commission has promulgated rulings which are implemented by Underwriters Laboratory to the effect that safety means must be provided to prevent electrical shock if a hair dryer should fall into water with the switch of the hair dryer in its "OFF" position. This ruling, which became effective in or about October of 1987, was based on the premise that most accidents of this type occurred when the hair dryers are not in use, i.e., the operating switch for same was in the "OFF" position, and the hair dryer somehow inadvertently fell into a bathtub or the like. For example, someone taking a bath who intended to use an appliance of this type might position same on the rim of the bathtub and then accidentally knock same into the water, resulting in the possibility of electrical shock. The theory apparently was that when the appliance was in actual use, and the operating switch was in its "ON" position, the appliance was being held by the user and was less likely to accidentally fall into the water. Of course, this did not apply to appliances such as small radios, and furthermore, experience has shown that even when the appliance is being held by the user and is in actual use, there is always the possibility that the appliance will become inadvertently dislodged from the user's grasp and fall into the water.

Thus, Underwriters Laboratories has come out with a further ruling, to be effective Jan. 1, 1991, to the effect that safety means must be provided for hair dryers to prevent electrical shock when the hair dryer falls into water or otherwise suffers a ground fault for any reason, regardless of whether the switch of the hair dryer is "OFF" or "ON".

Under the previous regulations wherein hair dryers were required to be safe only when the hair dryer was in its "OFF" position, double-pole waterproof switches, such as the type of switches shown in U.S. Pat. Nos. 4,652,706 and 4,789,766, satisfactorily resolved the problem and met the then existing regulatory requirements. However, under the new regulations, coming into effect on Jan. 1, 1991, where it is necessary to have a ground fault interrupter operative in response to the presence of any kind of ground fault condition, whether or not the appliance is in its "OFF" or "ON" position, new design and development work has become necessary, and the present invention provides a compact and efficient ground fault interrupter or ALCI that will effectively meet the safety requirements that become effective on Jan. 1, 1991.

Obviously ground fault interrupters are not new in the art, and U.S. Pat. No. 4,719,437 dated Jan. 12, 1988 is exemplary of the type of ground fault interrupters that have heretofore existed, and said patent is thought to represent the closest prior art of which applicants are aware. However, the device shown in U.S. Pat. No. 4,719,437 has certain disadvantages in that it is relatively cumbersome, and more importantly, will not effectively function to interrupt the flow of current if for some reason or somehow outward movement of the reset button is prevented wherein a ground fault may exist.

SUMMARY OF THE INVENTION

One of the primary objectives of the present invention is to provide a ground fault interrupter which comprises a reset button that automatically moves to an outwardly extended position with respect to the housing of the device in response to the presence of a ground fault in the system, and which at the same time causes interruption of current flow to the appliance. However, in the present invention interruption of the current flow is not dependent upon movement of the reset button, and hence if for some reason movement of the latter is prevented and a ground fault occurs, the desired current interruption will still take place. This is obviously an extremely important safety feature.

The relative compactness of the ground fault interrupter of the present invention is of extreme importance, because it permits the device to be incorporated in the electrical connector, i.e., male plug, that is electrically connected to the appliance, whereby whenever and wherever the appliance is used, the ground fault interrupter is automatically present. Contrast this with situations that have sometimes existed in the past wherein the ground fault interrupter, due to its complexity and lack of compactness, was mounted in the bathroom wall socket, rather than in the male plug attached to the appliance. Although this was fine as long as the appliance was used in that particular bathroom and was plugged into that particular wall socket, this obviously did not solve the problem where the appliance was used in other locations where the wall sockets had no ground fault interrupters incorporated therein.

Another important feature of the present invention is that although it contains both reset and test buttons, the mechanism is such that these buttons are located in close proximity to each other so as to promote maximum compactness of the plug or housing. And while the use of reset and test buttons in devices of this type is certainly not new, the idea of providing these buttons in such close proximity to each other that they are almost abutting, but at the same time providing means for minimizing the likelihood of accidental or undesirable tripping or manipulation of the buttons, is thought to be novel and represents a significant advance in the art. Toward this end a protective guard wall extends outwardly from the housing of the device and closely surrounds the reset and test buttons to make it more difficult to attempt to manipulate the buttons in some way and/or to accidentally actuate same. Also, the protective guard wall minimizes likelihood of breakage of the reset and test buttons if the device is accidentally dropped onto a hard surface.

The foregoing objectives are achieved by providing a device wherein any current imbalance that exists in the neutral and line leads of the power cord, which imbalance signifies the presence of current leakage or a ground fault, sends a signal through an electronic circuit which is amplified to energize a solenoid, all of which is pretty much conventional in devices of this type. The device further comprises a pair of fixed contacts and a pair of movable contacts, the movable contacts being spring loaded so as to be urged in a direction away from the fixed contacts to interrupt the flow of current to the associated appliance. A slidably mounted reset member is normally coupled to contact actuator means which are in engagement with the movable contacts and which, as a result of spring means associated with the reset member, cause the movable contacts to be moved, against their normal bias, into engagement with the fixed contacts to close the electrical circuit. When, however, the solenoid is energized pursuant to the presence of a ground fault, the solenoid plunger moves the latch means to an inoperative position wherein the reset member and the contact actuator means are no longer coupled, at which time the biasing effect of the movable contacts causes the movable contacts and the contact actuator means to move in one direction wherein electrical continuity between the movable and fixed contacts no longer exists, while at the same time the spring-loaded reset member moves in an opposite direction, and since the reset member extends outwardly of the housing, the movement thereof functions as a visual signal that the flow of current has been interrupted. By manually depressing the reset means, the spring-loaded latch will snap back into its operative latching position wherein the reset member and the contact actuator means are once again coupled, whereupon when manual pressure on the reset member has been removed, the spring loading of the reset member once again causes movement of the assembly to force the movable contacts back into electrical engagement with the fixed contacts. An important feature here is that when the solenoid is actuated and the latch is released to disconnect the reset member and the contact actuator means, the resultant movement of the latter will effect interruption of the current flow, as previously described, even if for some reason movement of the reset member is precluded.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE PREFERRED FORM OF THE INVENTION

Figure 1:
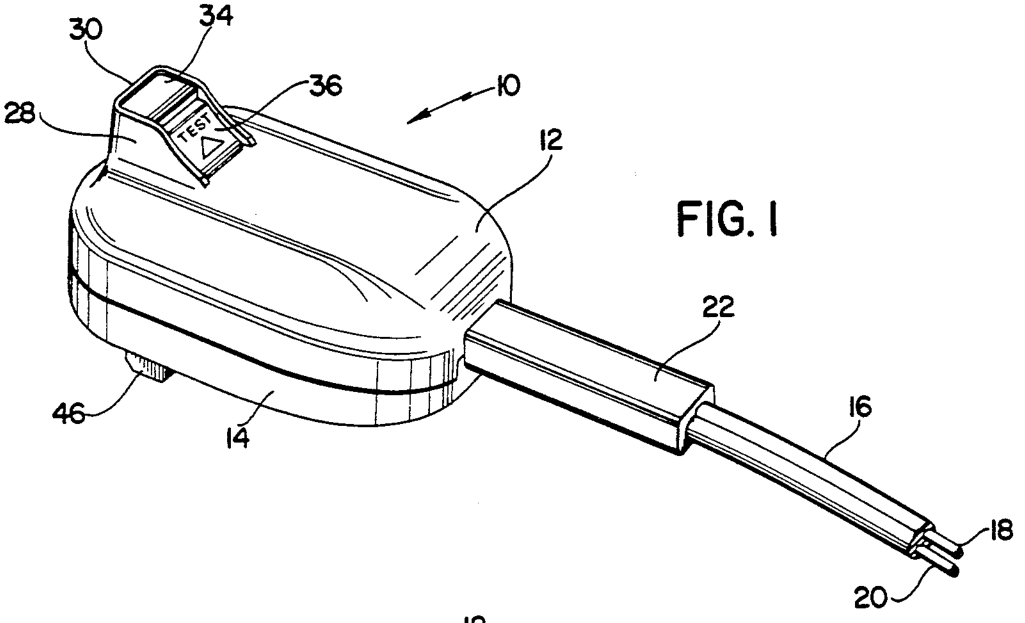
FIG. 1 is a perspective view of the external housing within which an appliance leakage current interrupter in accordance with the present invention is located.

Referring now to the drawings, the appliance leakage current interrupter of the present invention is shown in its assembled condition generally at 10 in FIG. 1, it being noted that the plug 10 comprises a top housing 12 and a bottom housing 14 connected to each other by any suitable securing means, such as screws (not shown). A power cord 16 comprising neutral and line leads 18, 20, respectively, extends through cord guard 22 into the interior of plug 10 where each makes electrical contact with movable contacts located therein. One such movable contact is shown at 24 in FIG. 22, the connection between line lead 20 and movable contact 24 being shown at 26. It will be understood that there is a second movable contact 25 identical to contact 24 except that the contact 25 is electrically connected to neutral lead 18. The cover 12 of plug 10 is provided with an integral, upwardly extending guard wall 28 having a rear wall portion 30 and side wall portions 32 that snugly surround a reset button 34 and a test button 36 which will hereinafter be described in more detail. At its opposite extremity, the power cord 16 is connected to whatever appliance (not shown) with which the ALCI plug is associated. It will be understood, however, that a ALCI plug 10 is usable with any desired small appliance, such as a hair dryer, electric shaver, radio, etc.

Bottom housing 14 has mounted therein a pair of fixed contacts 38, 40 having extending therefrom a pair of male contact blades 42, 44, it being noted that blade 42 has a polarized end portion 46 for insuring proper wiring connection. The blades 42, 44 extend outwardly through the bottom of lower housing 14 through suitably positioned slots therein (not shown). Thus, the plug 10 functions as a male plug for interengagement with a female socket (not shown) connected to an AC power source.

Figure 2:
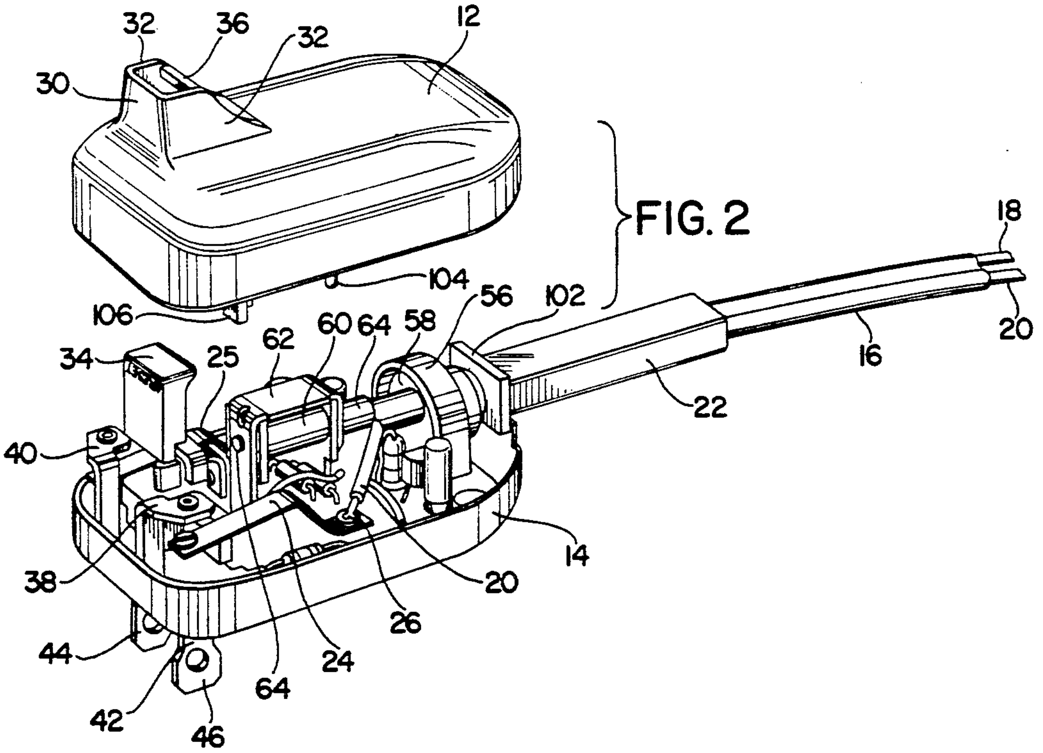
FIG. 2 is a perspective view similar to FIG. 1 but with the top cover of the housing elevated from the bottom housing.
Figure 3:
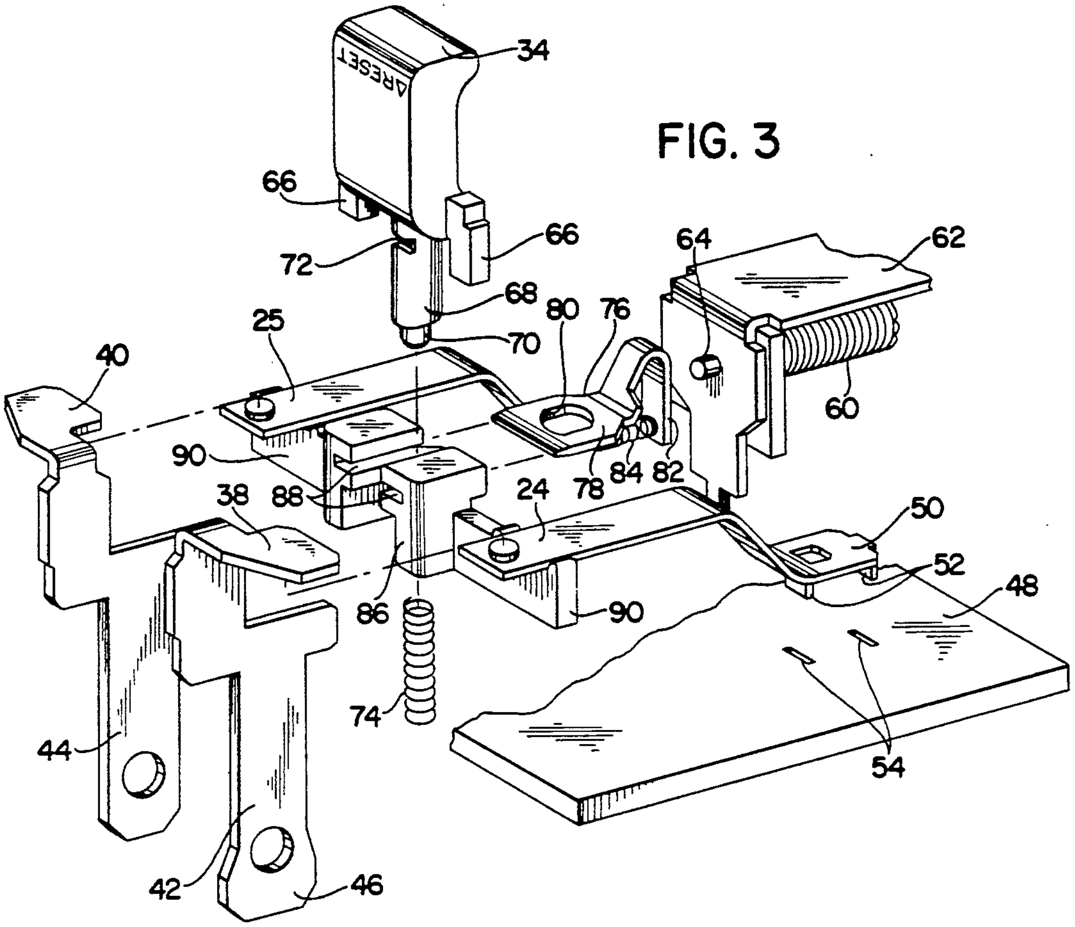
FIG. 3 is an exploded, partially fragmented perspective view showing the working components of the present invention.
Figure 4:
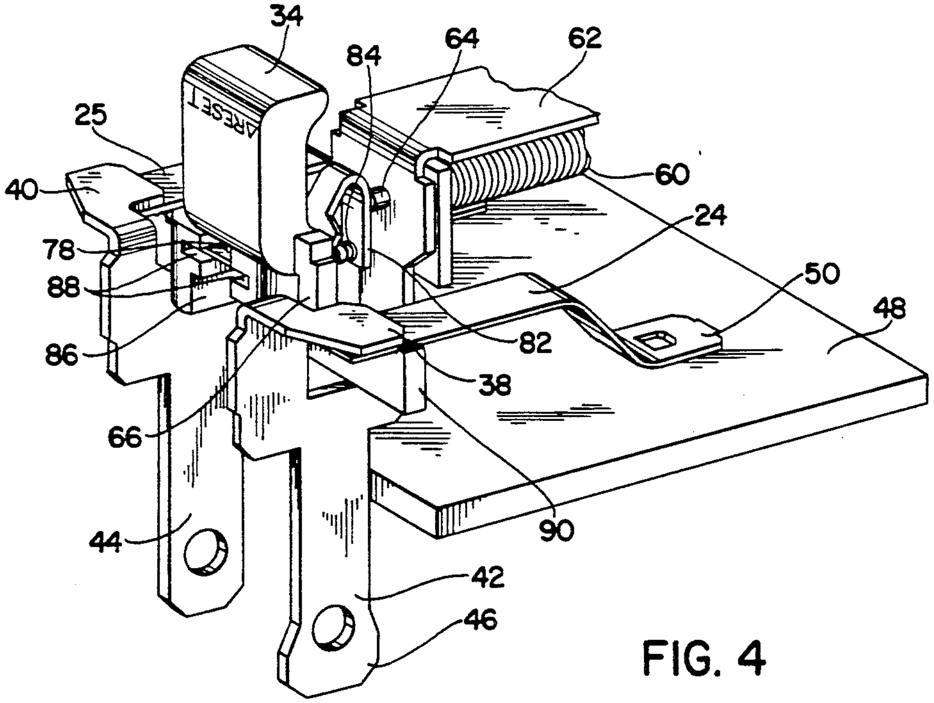
FIG. 4 is a partially fragmented perspective view showing the components of FIG. 3 in assembled relation.

Mounted within lower housing 14 is a PC board 48 to which movable contacts 24, 25 are secured, as shown most clearly in FIGS. 3 and 4 at 50. Specifically, the base portions 50 of the movable contacts 24, 25 have depending flanges 52 adapted to interengage with slots 54 in PC board 48. It is important to note that the movable contacts 24, 25 are internally stressed so as to be normally biased downwardly, as shown in broken lines in FIG. 6. Also mounted on PC board 48 is a differential transformer 56 (FIG. 2) having a toroidal core 58. Part of the load connection comprising the neutral and line leads 18, 20 provides single-turn opposed primary windings for differential transformer 56. Under normal operation, the current flowing through the neutral and line leads will be the same, and therefore the magnetic flux generated by the two primary wires will cancel each other. If, however, a ground fault occurs on the load side of the ALCI, the current flowing through the neutral lead would be less than the current flowing through the line lead, and due to this imbalance, the magnetic fluxes generated by the primary windings will not cancel out, and a resultant flux flow will occur. This sends a signal through the PC board which is amplified to energize a solenoid 60 carried by bracket 62 which in turn is mounted on printed circuit board 48. Solenoid plunger 64 extends through a suitable opening in the vertical wall of bracket 62 and, when extended due to energization of solenoid 60, functions to operate a trip mechanism now to be described.

Figure 5:
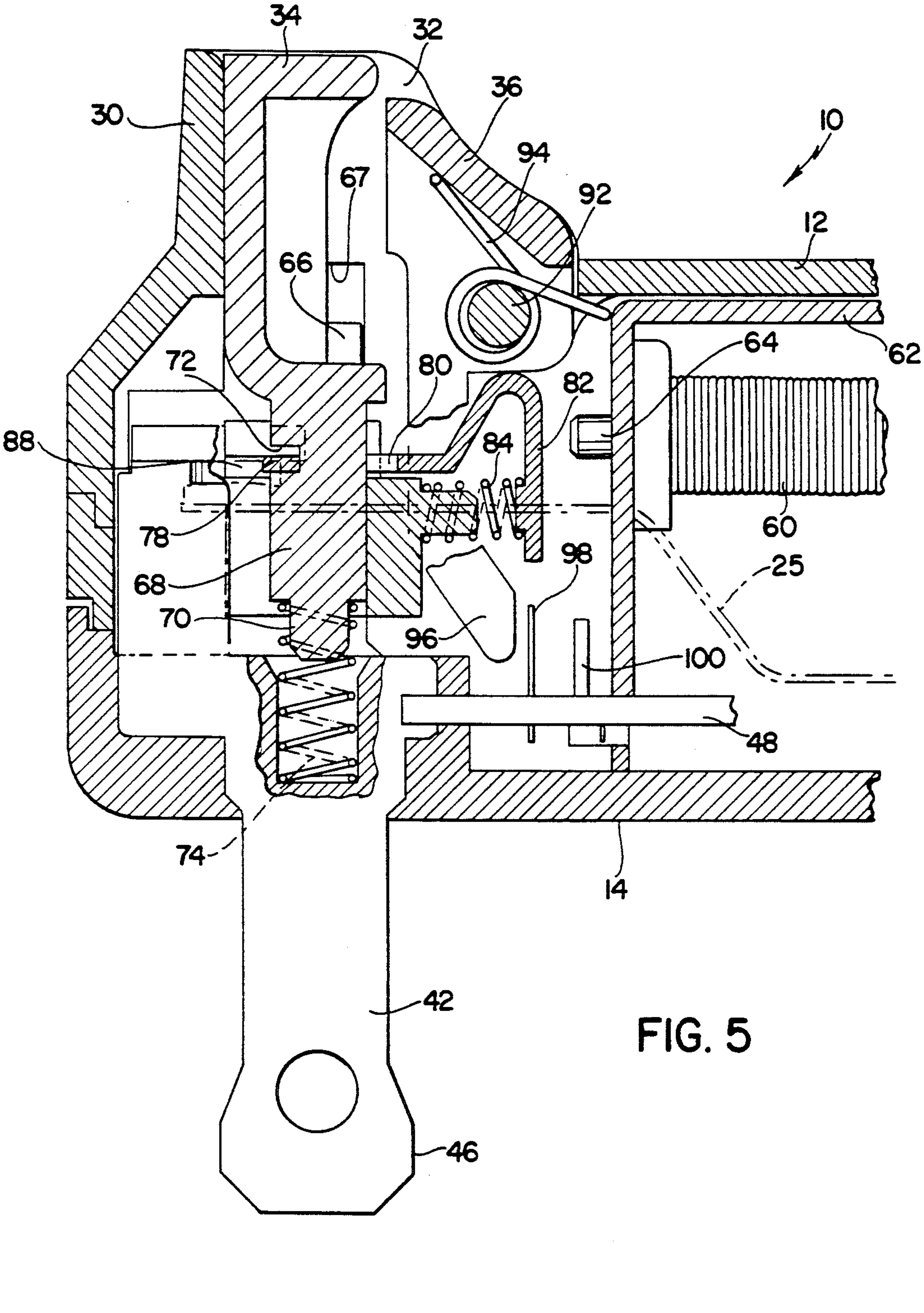
FIG. 5 is a cross-sectional view showing the working components of the instant device in their normal operating position wherein current is flowing to the appliance.

Referring now to FIGS. 3 through 6, it will be seen that aforesaid reset button 34 has a pair of oppositely disposed guide means 66 extending outwardly therefrom, which guide means ride in mating grooves 67 (see FIG. 6) provided in upper housing 12 in order to permit reset button 34 to slidably move in a vertical direction with respect to plug 10. Extending downwardly from reset button 34 is a reset shaft 68 having a reduced terminal end 70 and having a groove or notch 72 provided therein. A reset spring 74 engages reduced terminal end 70 to normally urge the reset shaft and button assembly upwardly. However, such upward movement of the reset assembly is normally prevented by latch means 76 comprising a blade portion 78 having an aperture 80 therein and further comprising a downwardly curved rear extension 82. The aperture 80 receives therethrough the reset shaft 68, and with blade 78 in registry with notch 72, latch spring 84 biases latch means 76 to its latching position wherein the forward edge of aperture 80 is interengaged with notch 72, as illustrated in FIG. 5, thereby preventing upward movement of reset button 34 pursuant to urging of spring 74.

Figure 6:
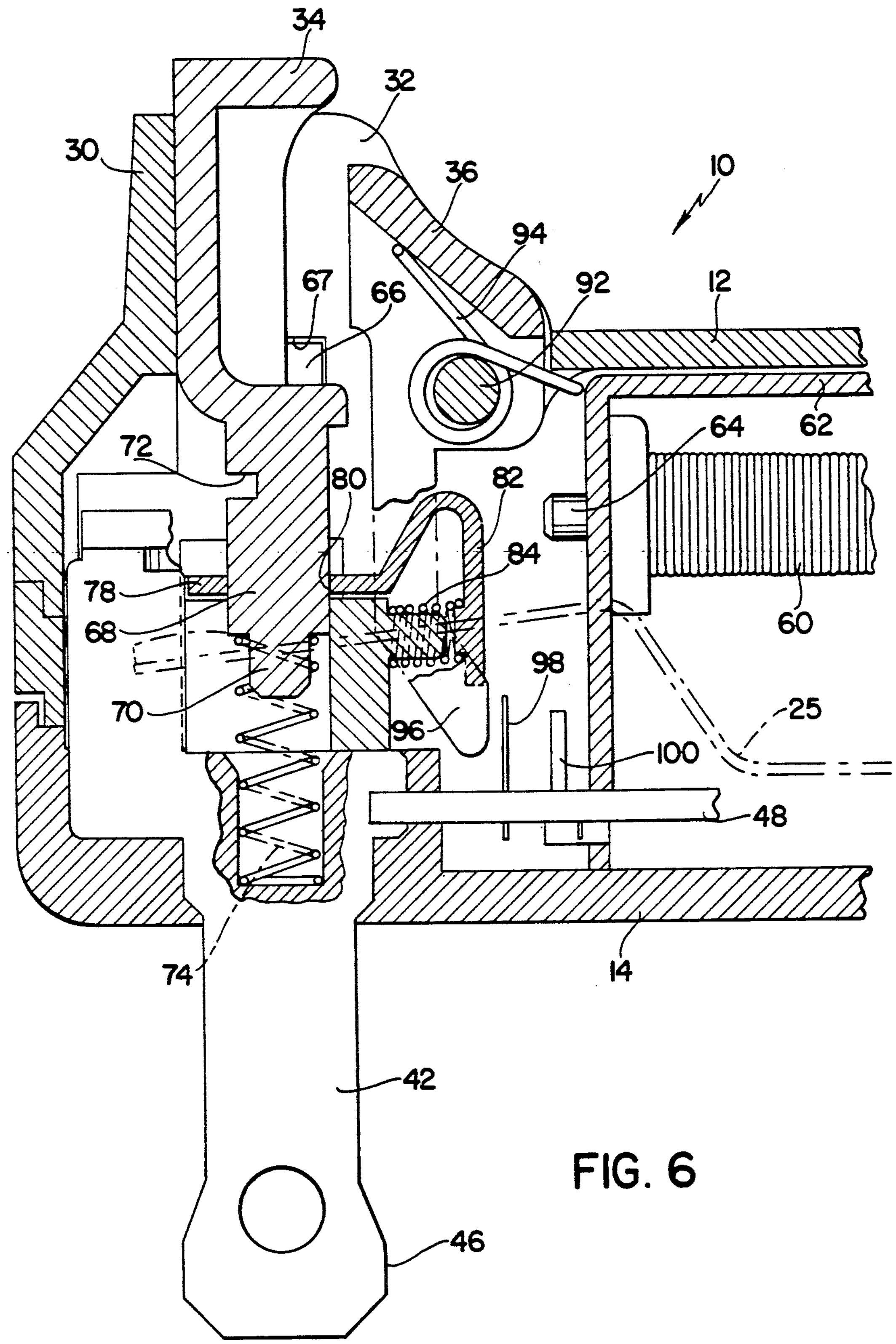
FIG. 6 is a cross-sectional view similar to FIG. 5 except that the components are shown after releasing of the latch resulting in interruption of the current flow.

A pair of identical contact actuators 86 are assembled to latch 76 by means of oppositely disposed trackways 88 through which blade portion 78 of latch 76 slidably extends, it being understood that the contact actuators can be interconnected to each other to form a single unit, so that the unit can be made in a single molding operation. Contact actuators 86 also comprise outwardly extending support arms 90, the upper edges of which receive the movable contacts 24, 25. Thus, the latch means 76 functions to couple contact actuators 86 to reset shaft 68 when the latch is in its operative locking position, as illustrated in FIG. 5. In this position, the movable contacts 24, 25 have been forced upwardly against their inherent bias by the support arms 90, which in turn have been moved upwardly by reset spring 74 which is in resilient engagement with reset shaft 68, which in turn is latched to contact actuators 86 by latch means 76. In order for this action to occur, it will be understood that spring 74 exerts a greater force than does the resilient bias of movable contacts 24, 25, whereupon the latter bias is overridden by spring 74 to cause upward movement of contact actuators 86 and the movable contacts 24, 25 riding thereon until said movable contacts make electrical engagement with fixed contacts 38, 40, which engagement limits the upward travel of the entire assembly. In this position, current flows from the AC source through the plug 10 to the appliance to operate same when the appliance switch is in its "ON" position. If, however, a ground fault occurs causing a current leakage which creates an imbalance between the neutral and line leads, said imbalance is immediately sensed by the PC circuit, as aforedescribed, and an amplified signal is introduced to the solenoid to energize same, causing plunger 64 to move outwardly into engagement with rear extension 82 of latch 76, thereby causing the latch 76 to slidably move against the bias of spring 84 until the forward edge of aperture 80 becomes disengaged from notch 72. At this point, the reset assembly is no longer coupled to latch 76 and contact actuators 86, whereupon reset spring 74 immediately moves the reset button 34 upwardly from its normal position as illustrated in FIG. 5 to its raised position as illustrated in FIG. 6. At the same time, the downward resilient bias of movable contacts 24, 25 force support arms 90 downwardly, carrying therewith the contact actuators 86 and latch 76. The downward movement of movable contacts 24, 25 separate said contacts from fixed contacts 38, 40, whereupon the flow of current through the plug is immediately interrupted. The upward movement of button 34 provides a visual signal that current flow has been interrupted. In order to resume current flow, reset button 34 is manually depressed until notch 72 comes into registry with latch 76, at which point spring 84 automatically causes the latch to move to its operative locking position to once again couple the reset assembly to latch 76 and contact actuators 86, at which point reset spring 74 again takes over and moves the contact actuators upwardly until movable contacts 24, 25 have once again been forced into electrical engagement with fixed contacts 38, 40.

An important feature of the present invention is the fact that when a ground fault has been sensed, causing latch 76 to move to its inoperative, disengaged position with respect to reset shaft 68, the downward resilient bias of movable contacts 24, 25 automatically causes breaking of the contacts regardless of whether the reset assembly moves upwardly. In other words, if someone were to manually hold reset button 34 in its normal position of FIG. 5, or perhaps tape it in said position, current flow would still be interrupted in response to the presence of a ground fault. The fact that flow of current is automatically interrupted in applicants' device responsive to the presence of a ground fault, whether or not the reset button moves to its outer position, is an important safety feature of the present invention.

It is also important to note that when latch 76 is moved to its inoperative, disengaged position, the latch and its associated contact actuators immediately move downwardly pursuant to the biasing effect of movable contacts 24, 25. Thus, when reset button 34 is manually depressed to reset the device, it is necessary to depress button 34 to a position somewhat lower than its normal position illustrated in FIG. 5. This downward overtravel is facilitated by the fact that reset button 34, in its normal position as illustrated in FIG. 5, is positioned a predetermined distance from the top surface of upper housing 12. Thus it is easier to depress button 34 sufficiently to effect resetting than it would be if the normal position of the button were such that its upper surface was flush with the upper surface of upper housing 12.

Figure 7:
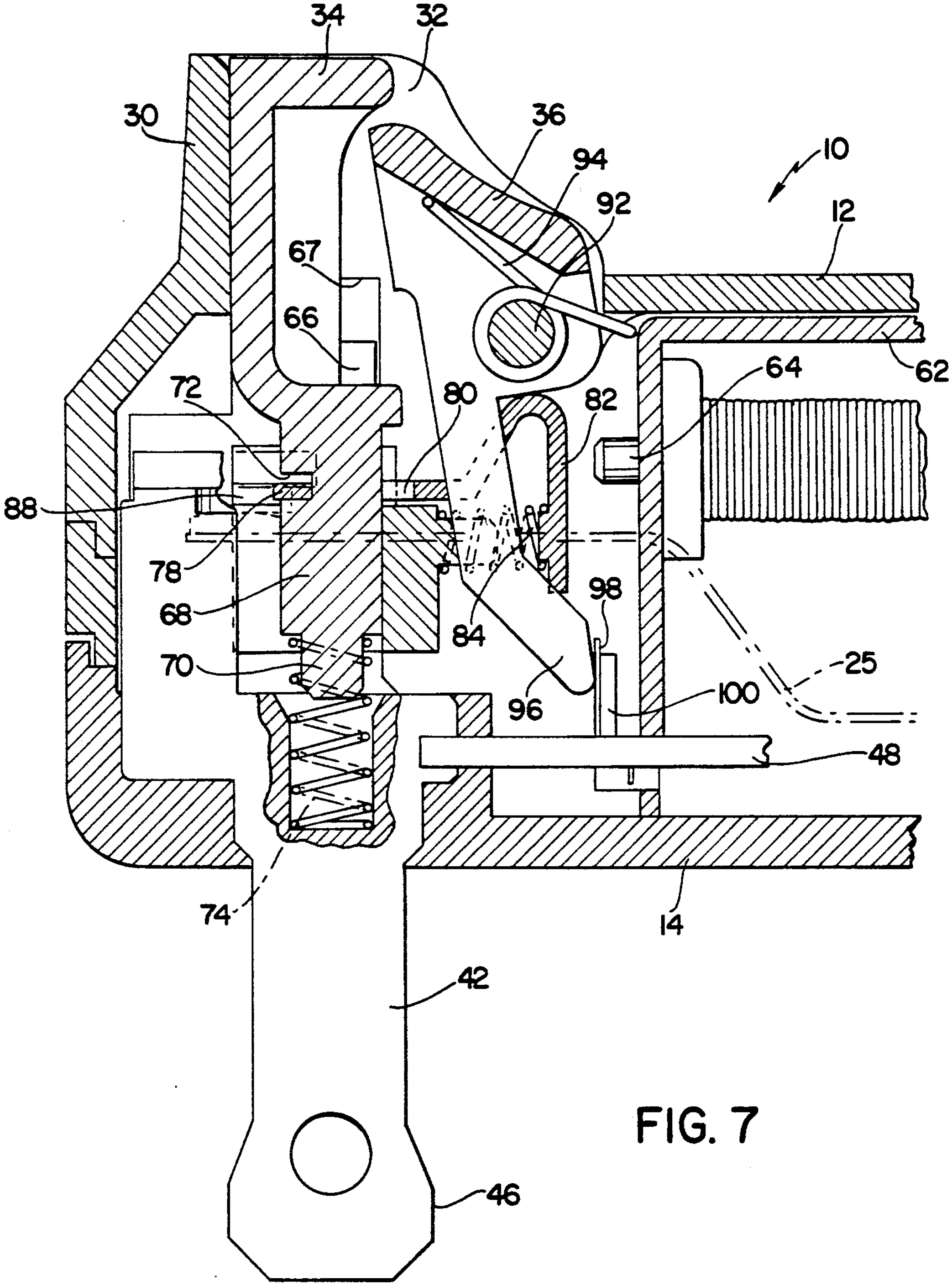
FIG. 7 is a cross-sectional view showing the test button after actuation thereof to create a simulated ground fault.

As will be seen most clearly in FIGS. 5 through 7, test button 36 is pivotally mounted to upper housing 12 by shaft 92 having torsion spring 94 mounted thereon, said spring normally urging test button 36 to its normal position as illustrated in FIG. 5. As will be seen most clearly in FIG. 7, test button 36 carries a depending arm portion 96 that functions as a bell crank, whereupon actuation of button 36 from the position illustrated in FIG. 5 to the position illustrated in FIG. 7 causes the lower extremity of arm 96 to engage the free end of an elongated leaf contact 98 to move same from its open position illustrated in FIG. 5 to its closed position illustrated in FIG. 7 wherein contact 98 is in engagement with fixed contact 100, which engagement electrically creates a current imbalance in the system to simulate the presence of a ground fault, at which point solenoid 60 becomes energized to force latch means 76 to its inoperative, disengaged position wherein movable contacts 24, 25 move away from fixed contacts 38, 40 to interrupt current flow, all as hereinbefore described. Thus, applying the aforesaid rocking movement to test button 36 by applying counterclockwise movement thereof around its mounting shaft 92 simulates a ground fault in order that one may at any time test to see whether the ground fault interrupter mechanism and circuitry is properly functioning.

As will be noted, reset button 34 and test button 36 are mounted in extremely close proximity to each other, thus creating maximum compactness of the assembly. The manner in which reset button 34 moves in a direction normal to the surface of upper housing 12 whereas test button 36 is angularly disposed with respect to said upper surface minimizes the likelihood of one button being accidentally actuated when it is desired to actuate the other button. Also, guard wall 28 which extends around the sides of test button 36 and reset button 34 and around the back of the latter with the edges of said wall being substantially flush with the outer surfaces of buttons 34, 36 minimizes the likelihood that the test button will be accidentally actuated, and also minimizes the possibility of tampering with reset button 34, such as by trying to apply lateral movement thereto. The physical location of the reset and test buttons in close proximity to each other, and the protective guard wall extending therearound, are considered to be important features of the instant invention.

The upper and lower housing portions, as well as most of the operating components, with the exception, of course, of the various contact means and springs, may be constructed of any desirable plastic material, such as by injection molding or the like. Other conventional features shown in the drawings comprise strain-relief means shown at 102 in FIG. 2 and locator pin 104 adapted to engage PC board 48 when cover 12 is secured to base 14 to insure proper relative positioning of the parts. To help maintain PC board 48 properly positioned in the assembled device, upper cover 12 carries a downwardly extending post 106 that bears against the PC board when cover 12 is secured to base 14.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An electrical connector for small appliances, said connector comprising a housing having a reset member slidably mounted therein, first resilient means biasing said reset member in a first direction, fixed contact means mounted in said housing, movable contact means mounted in said housing, second resilient means biasing said movable contacts away from said fixed contacts in a second direction opposite to said first direction, latching means coupling said movable contacts to said reset member wherein said first resilient means override said second resilient means to urge said movable contacts into engagement with said fixed contacts to permit current flow to the appliance, means responsive to the presence of a ground fault in the connector for moving said latching means to an unlatched position, wherein said first resilient means cause the reset member to move in said first direction, and said second resilient means cause said movable contacts to move in said second direction away from said fixed contacts to interrupt current flow to the appliance, said reset member comprising a button portion extending outwardly from said housing by a predetermined amount when said latching means is in its coupling mode, said button portion automatically moving to a more pronounced outward position when said latching means has moved to its unlatched mode, thereby visually signalling interruption of current flow to the appliance, said button portion being manually depressible to a position closer to the housing than said predetermined distance in order to permit said latching means to again assume its coupling mode whereby release of said button portion permits said first resilient means to once again urge said movable contacts into engagement with said fixed contacts to resume current flow to the appliance, said connector further comprising a guard wall extending outwardly form said housing in close proximity to a peripheral portion of said button portion, the outer edge of said wall being substantially flush with the outer end of said button portion when the latter is at its normal predetermined distance from said housing, whereby said wall protects said button portion against undesirable or accidental manipulation and breakage.

2. The connector of claim 1 further comprising a test button on said housing, means responsive to actuation of said test button to simulate a ground fault in the connector in order to determine whether the current interrupter is properly functioning, said test button being located adjacent to said reset button portion, said guard wall also extending around a sufficient portion of the periphery of said test button to minimize the likelihood of accidental actuation or breakage thereof.

3. In a ground fault interrupter for small appliances wherein the presence of a ground fault causes automatic interruption of flow of electrical current to the appliance, and wherein movement of an external reset button simultaneously takes place to visually signal the presence of a ground fault and interruption of the circuit, the improvement comprising a housing in which said ground fault interrupter is located and through which said reset button outwardly extends, means positioning the outermost end of said reset button at a predetermined distance from said housing when no ground fault exists, means causing the outermost end of said button to move further away from said housing in response to the presence of a ground fault, and a guard wall extending outwardly from said housing in close proximity to a peripheral portion of said button, the outer edge of said wall being substantially flush with the outermost end of said button when the latter is at its normal predetermined distance from said housing, whereby said wall protects said button against undesirable or accidental manipulation and breakage.

4. The ground fault interrupter of claim 3 further comprising a test button located exteriorly of said housing, means responsive to the actuation of said test button to simulate a ground fault in order to determine whether the ground fault interrupter is properly functioning, said test button being located adjacent to said reset button, said guard wall also extending around a sufficient portion of the periphery of said test button to minimize the likelihood of accidental actuation or breakage thereof.

5. The ground fault interrupter of claim 4 further characterized in that the outermost end of said reset button comprises a surface generally parallel to the surface of said housing, said reset button being movable in a direction generally normal to said housing surface, the outer surface of said test button inclining from the adjacent edge of said reset button outer surface to the surface of said housing, means mounting said test button for rocking movement when actuated, said guard wall having an end wall and a pair of side walls surrounding said reset and test buttons, the upper edges of said side walls having straight portions extending adjacent to the upper side edges of said reset button and inclined portions extending adjacent to the upper side edges of said test button.

6. An appliance leakage current interrupter comprising a housing, a pair of fixed contacts mounted therein comprising as a part thereof male blade portions extending outwardly from said housing, a pair of movable contacts mounted in said housing for movement from a first position wherein they are in engagement with said fixed contacts to close an electrical circuit to a second position wherein they are spaced from said fixed contacts to open the circuit, first resilient means normally urging said movable contacts to said second position, a reset member slidably mounted in said housing, contact actuator means having portions engaging said movable contacts to cause movement of the latter against their spring bias toward said fixed contacts, a spring-loaded latch assembly normally releasably interconnecting said reset member and said contact actuator means whereby they move as a unit when latched together, said movement terminating when said movable contacts reach their said first position, second resilient means urging said reset member and the contact actuator means latched thereto in a direction opposite to the direction of force of said first resilient means, said second resilient means being stronger than said first resilient means whereby said contact actuator means force said movable contacts to said first position, means responsive to the presence of a ground fault in the system for causing said latch assembly to move to unlatched position, whereby said first resilient means move said contact actuator means and said movable contacts to said second position, and said second resilient means move said reset member in the opposite direction, said latch assembly comprising a shaft extending downwardly from said reset member, a notch in said shaft, and a blade portion resiliently urged into interengagement with said notch, said responsive means comprising a solenoid that is energized pursuant to the presence of a ground fault to slidably remove said blade from said notch.

* * * * *